US012545085B2

(12) United States Patent
Oakley et al.

(10) Patent No.: US 12,545,085 B2
(45) Date of Patent: Feb. 10, 2026

(54) VEHICLE CURTAIN SYSTEM

(71) Applicant: Volvo Truck Corporation, Gothenburg (SE)

(72) Inventors: William Oakley, Kernersville, NC (US); Lakshmikanth Govindaiah, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 191 days.

(21) Appl. No.: 18/503,520

(22) Filed: Nov. 7, 2023

(65) Prior Publication Data
US 2025/0144983 A1  May 8, 2025

(51) Int. Cl.
*B60J 1/20* (2006.01)
*A47H 1/06* (2006.01)

(52) U.S. Cl.
CPC .............. *B60J 1/2011* (2013.01); *A47H 1/06* (2013.01)

(58) Field of Classification Search
CPC ....... B60J 1/08; B60J 1/085; B60J 1/12; B60J 1/16; B60J 1/2011; A47H 1/06
See application file for complete search history.

(56) References Cited

U.S. PATENT DOCUMENTS

| | | | | | |
|---|---|---|---|---|---|
| 926,118 | A * | 6/1909 | Hoelscher | ............... | B60J 1/2011 296/141 |
| 1,024,305 | A * | 4/1912 | Applas | ..................... | B60J 1/085 296/141 |
| 1,426,969 | A * | 8/1922 | Dunham | ................. | B60J 1/2091 296/141 |
| 1,601,443 | A * | 9/1926 | Haver | .................... | B60J 1/2011 296/141 |
| 1,753,795 | A * | 4/1930 | Linn | ........................ | B60J 1/085 160/DIG. 7 |
| 2,412,608 | A * | 12/1946 | Fridolph | .................. | A47H 1/06 16/95 D |
| 2,496,910 | A * | 2/1950 | Fridolph | ................ | B61D 17/18 16/87.4 W |
| 2,782,846 | A * | 2/1957 | Arthur | .................... | B60P 3/205 296/24.35 |
| 2,934,782 | A * | 5/1960 | Wootton | ................ | A47H 15/04 267/71 |
| 3,709,553 | A * | 1/1973 | Churchill | ................. | B60J 11/00 296/145 |
| 4,109,957 | A * | 8/1978 | Polizzi | ..................... | B60J 11/08 160/DIG. 2 |
| 4,226,460 | A * | 10/1980 | Schmidt | ............... | B62D 35/001 296/37.7 |

(Continued)

*Primary Examiner* — Johnnie A. Shablack
(74) *Attorney, Agent, or Firm* — Withrow & Terranova, PLLC

(57) ABSTRACT

A vehicle comprising a windscreen and a side door having a window, the vehicle further comprising a curtain assembly, the curtain assembly comprising: a rail located above the window; a series of first connectors located above the windscreen; a curtain comprising: a piece of fabric; a series of runners fixed to the piece of fabric, the runners of the series of runners being engaged and slidable in the rail; and a series of second connectors fixed to the piece of fabric, each second connector of the series of second connectors being releasably engageable with a respective first connector of the series of first connectors.

20 Claims, 2 Drawing Sheets

(56) References Cited

U.S. PATENT DOCUMENTS

| | | | | |
|---|---|---|---|---|
| 4,230,171 A * | 10/1980 | Baker, Sr. | A47H 13/14 | |
| | | | 160/84.01 | |
| 4,720,137 A * | 1/1988 | Higgins | B60J 1/2011 | |
| | | | 16/95 D | |
| 4,972,895 A * | 11/1990 | Meshaka | A47H 13/16 | |
| | | | 160/348 | |
| 5,085,473 A * | 2/1992 | Yang | B60J 1/2069 | |
| | | | 296/141 | |
| 5,111,867 A * | 5/1992 | Horton | B60J 5/065 | |
| | | | 16/87.6 R | |
| 5,259,520 A * | 11/1993 | Roggio | A47H 15/04 | |
| | | | 16/95 D | |
| 5,509,713 A * | 4/1996 | Hou | B60J 1/2011 | |
| | | | 160/370.21 | |
| 5,615,461 A * | 4/1997 | Tominaga | A47H 13/04 | |
| | | | D8/382 | |
| 5,639,524 A * | 6/1997 | Lin | B60J 1/2011 | |
| | | | 296/97.3 | |
| 5,676,189 A * | 10/1997 | Zeeb | B60J 1/2011 | |
| | | | 248/265 | |
| 5,937,929 A * | 8/1999 | Chen | B60J 1/2091 | |
| | | | 296/97.8 | |
| 6,044,891 A * | 4/2000 | Guo | B60J 1/2011 | |
| | | | 160/370.21 | |
| 6,182,739 B1 * | 2/2001 | Jones | A47H 13/14 | |
| | | | 160/330 | |
| 6,382,297 B1 * | 5/2002 | Takizawa | A44B 18/0049 | |
| | | | 24/716 | |
| 6,438,796 B1 * | 8/2002 | Davidson | A47H 15/04 | |
| | | | 16/93 R | |
| 7,946,615 B2 * | 5/2011 | Takahashi | B60R 21/232 | |
| | | | 280/730.2 | |
| 8,251,433 B2 * | 8/2012 | Boer | B60J 1/2011 | |
| | | | 296/97.7 | |
| 8,910,697 B1 * | 12/2014 | Dollahan Shirk | A47H 13/06 | |
| | | | 160/368.1 | |
| 9,156,334 B1 * | 10/2015 | Robins | B60R 21/08 | |
| 9,902,241 B2 * | 2/2018 | Guzzetta | B60J 11/06 | |
| 10,806,288 B2 * | 10/2020 | Schöpfer | A47H 15/02 | |
| 11,724,574 B2 * | 8/2023 | Berne | B60J 1/2011 | |
| | | | 348/148 | |
| 2005/0057023 A1 * | 3/2005 | Burton | B60R 21/232 | |
| | | | 280/730.2 | |
| 2005/0194108 A1 * | 9/2005 | Lin | B60J 1/2091 | |
| | | | 160/370.21 | |
| 2007/0277944 A1 * | 12/2007 | Wu | A47H 13/01 | |
| | | | 160/330 | |
| 2013/0068406 A1 * | 3/2013 | Lin | B60J 1/2091 | |
| | | | 160/331 | |
| 2016/0374496 A1 * | 12/2016 | Marcinik | A47H 15/02 | |
| | | | 160/331 | |
| 2025/0144983 A1 * | 5/2025 | Oakley | B60J 1/2011 | |

* cited by examiner

VEHICLE CURTAIN SYSTEM

TECHNICAL FIELD

The disclosure relates generally to land vehicle cabin equipment. In particular aspects, the disclosure relates to a vehicle equipped with a curtain system. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles may be equipped with a curtain system enabled to provide privacy to an occupant. A curtain system generally comprises one or more pieces of fabric suspended below a guiding rail. Runners glide in the rail as the piece of fabric is pulled by a user. The piece of fabric may be deployed to cover substantially the entirety of one or more windows. The piece of fabric may be retracted in a storing configuration, generally out of the sight of the driver of the vehicle.

SUMMARY

According to a first aspect of the disclosure, a vehicle comprises a windscreen and a side door having a window, the vehicle further comprising a curtain assembly, the curtain assembly comprising: a rail located above the window; a series of first connectors located above the windscreen; a curtain comprising: a piece of fabric; a series of runners fixed to the piece of fabric, the runners of the series of runners being engaged and slidable in the rail; and a series of second connectors fixed to the piece of fabric, each second connector of the series of second connectors being releasably engageable with a respective first connector of the series of first connectors.

This disclosure aims at preventing a rail from interfering with the deployment of an airbag which may be arranged laterally above the door, in the A-pillar of the vehicle, or above the windscreen. Additionally, a rail having the size of the door is easier to handle when assembling the vehicle and is less prone to damage before being fixed to the vehicle. Furthermore, the design of the present disclosure is simple and cost-efficient.

In the present disclosure, a rail is intended to depict any design of elongated rigid material, which may comprise an elongated metallic or plastic profile. Runners (also known as gliders) are attached to the fabric and configured to slide along/in the rail. At one corner of the fabric, one runner may be fixed to the rail so as to arrest the movement of the fabric as it is being pulled to be deployed.

In an alternative arrangement, the rail is arranged above the windscreen and the first/second connectors are arranged above the door. In yet another alternative arrangement, the rail is replaced with connectors of the same or of a different nature than the first connectors and the runners of the curtain assembly are replaced with connectors of the same or of a different nature than the second connectors.

In another aspect, the first connectors are rings, and the second connectors are hooks releasably engageable in the rings. Alternatively, the rings may be provided on the curtain assembly as second connectors and the hooks may be provided above the windscreen as first connectors. Hooks and rings are a reliable and easy choice of design for the fixation of the curtain.

The hooks may be made of the same or of a different material than the rings. For instance, the hooks and/or the rings may be made of plastic or metallic material.

In another aspect, the first connectors are permanent magnets of a first polarity, and the second connectors are permanent magnets of a second polarity opposite the first polarity. The use of magnets may make the system more user friendly as it does not require a precise positioning of the connectors with respect to one another, making the fixation of the curtain faster.

In another aspect, the first connectors and the second connectors are hook-and-loop fasteners. This constitutes a further alternative design which may be convenient to use.

In another aspect, the vehicle further comprises an airbag arranged above the window or along an A-pilar of the vehicle, the airbag being enclosed in a housing remote from the rail. The airbag may be configured to be deployed in case of an impact or a rollover.

In another aspect, the curtain comprises snap buttons enabling to hold the curtain in a retracted configuration, at least one of which being located between two adjacent second connectors. This design may be convenient to prevent the runners from inadvertently sliding along the rail as the vehicle is moving. Snap buttons may also avoid a portion of the curtain (aimed at covering part of all of the windscreen when deployed) to be hanging down when the curtain assembly is retracted.

In another aspect, the side door is a first side door, the window is a first window, the curtain assembly is a first assembly, the rail is a first rail, the series of first connectors is a first series of first connectors, the curtain is a first curtain, the piece of fabric is a first piece of fabric, the series of runners is a first series of runners and the series of second connectors is a first series of second connectors, the vehicle further comprising a second side door having a second window, and a second curtain assembly, the second curtain assembly comprising: a second rail located above the second window; a second series of first connectors located above the windscreen; a second curtain comprising: a second piece of fabric; a second series of runners fixed to the second piece of fabric, the runners of the second series of runners being engaged and slidable in the second rail; and a second series of second connectors fixed to the second piece of fabric, each second connector of the second series of second connectors being releasably engageable with a respective first connector of the second series of first connectors.

In such a case, the left-hand side door and at least part of the windscreen can be covered with a left curtain assembly while the right-hand side door and at least part of the windscreen can be covered with a right curtain assembly.

In another aspect, the first connectors of the second series are rings and the second connectors of the second series are hooks releasably engageable in the rings.

In another aspect, the first connectors of the second series are permanent magnets of a first polarity, and the second connectors of the second series are permanent magnets of a second polarity opposite the first polarity.

In another aspect, the first connectors of the second series and the second connectors of the second series are hook-and-loop fasteners.

In another aspect, the first and second series of first and second connectors, and the first and second pieces of fabric are configured such that as the second connectors of the first series engage the first connectors of the first series and as the second connectors of the second series engage the first connectors of the second series, the first and second pieces of fabric cover together substantially the entirety of the windscreen and of the first and second windows.

In another aspect, the first curtain comprises a third series of first connectors and the second curtain comprises a third series of second connectors configured to be releasably engaged with the first connectors of the third series of first connectors.

This can help to prevent any light from penetrating into the vehicle at the junction of the two curtains.

In another aspect, the first and second series of first, second and third connectors, and the first and second pieces of fabric are configured such that as the second connectors of the first series engage the first connectors of the first series and as the second connectors of the second series engage the first connectors of the second series, the second connectors of the third series can engage the first connectors of the third series.

In another aspect, the third series of connectors is one of: hooks and rings combination; magnets of opposite polarities; or hook-and-loop fasteners.

In another aspect, the first and second series of first and second connectors, and the first and second pieces of fabric are configured such that as the second connectors of the first series engage the first connectors of the first series and as the second connectors of the second series engage the first connectors of the second series, the first and second pieces of fabric are adjacent to one another along a substantially vertical line.

In another aspect, the vertical line is substantially centered with respect to the windscreen. In an alternative example, the vertical line is offset from the center, for example within a range of 30-70% of the lateral dimension of the windscreen.

In another aspect, the vehicle is an electric-motor or hybrid-motor truck. Alternatively, the vehicle may have an internal combustion engine.

In another aspect, the disclosure relates to a method for closing a curtain assembly in a vehicle, the vehicle comprising a windscreen and a side door having a window, the vehicle further comprising a curtain assembly, the curtain assembly comprising: a rail located above the window; a series of first connectors located above the windscreen; a curtain comprising: a piece of fabric; a series of runners fixed to the piece of fabric, the runners of the series of runners being engaged and slidable in the rail; and a series of second connectors fixed to the piece of fabric, each second connector of the series of second connectors being releasably engageable with a respective first connector of the series of first connectors, the method comprising: pulling the curtain so that the runners slide in the rail; and then connecting each second connector to a first connector.

In another aspect, the side door is a first side door, the window is a first window, the curtain assembly is a first assembly, the rail is a first rail, the series of first connectors is a first series of first connectors, the curtain is a first curtain, the piece of fabric is a first piece of fabric, the series of runners is a first series of runners and the series of second connectors is a first series of second connectors, the vehicle further comprising a second side door having a second window, and a second curtain assembly, the second curtain assembly comprising: a second rail located above the second window; a second series of first connectors located above the windscreen; a second curtain comprising: a second piece of fabric; a second series of runners fixed to the second piece of fabric, the runners of the second series of runners being engaged and slidable in the second rail; and a second series of second connectors fixed to the second piece of fabric, each second connector of the second series of second connectors being releasably engageable with a respective first connector of the second series of first connectors, the method further comprising: pulling the second curtain so that the runners of the second series of runners slide in the second rail; and then connecting each second connector of the second series of second connectors to a first connector of the second series of first connectors.

In another aspect, the method further comprises connecting the first piece of fabric to the second piece of fabric.

Another method may relate to opening the curtain system by performing the steps of the methods above in a reverse order.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
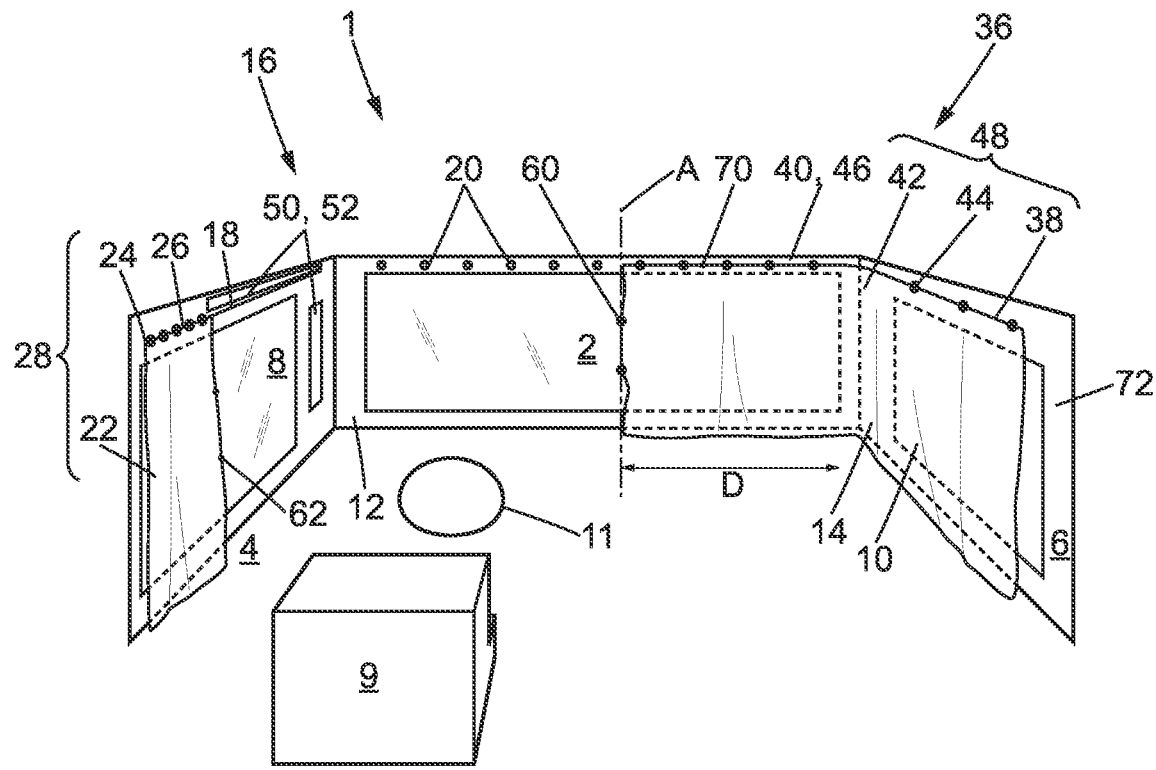
FIG. 1 is a schematic view of a portion of a vehicle according to an example.

FIG. 1 is a schematic view of a vehicle 1 according to an example. The vehicle 1 is represented with a point of view located inside the cabin of the vehicle.

FIG. 1 represents schematically that the vehicle comprises a windscreen 2, a first door 4 and a second door 6. In this illustration, the first door 4 is a left door and a driver's door. In another example, the first door 4 is a right door and/or a passenger's door.

The first door 4 has a first window 8 and the second door has a second window 10. The doors 4, 6 may contain any appropriate means for opening, closing, locking the door, as well as additional equipment, such as controllers, handle, airbag, storage compartments, etc. The windows 8, 10 may contain a slidable glass.

For illustration purposes, a driver's seat 9 and a steering wheel 11 are shown.

The windows 8, 10 are separated from the windscreen by A-pillars 12, 14.

The vehicle 1 may comprise a first curtain assembly 16 and a second curtain assembly 36. In an alternative design, a single curtain assembly is provided, which may be intended to cover the integrality of the windows and windscreen. The second curtain assembly 36 may mirror the first curtain assembly 16. In some examples, the second assembly 36 may be different from the first curtain assembly 16, for instance in terms of lengths of the curtain, material used, or technology used for the connectors.

The first curtain assembly 16 comprises a rail 18 that extends above the window 8. The rail 18 may be parallel to a top edge of the window 8. A series of first connectors 20 may be positioned above the windscreen 2. The first connectors 20 may be evenly spread or unevenly distributed above the windscreen 2. The first connectors 20 may comprise any number of connectors, for instance comprised between one and twenty connectors, more preferably comprised between three and six connectors. The first connectors 20 may have a ring shape, a hook shape, a hook-and-loop shape, or any other shape. They may be a combination of those. The first connectors 20 may be substantially aligned parallel to a top edge of the windscreen. The first connectors 20 may be molded into a storage shelf or the trim above the windscreen, and hence in some examples, the first connectors 20 are integrated to other elements of the vehicle and do not constitute a separate piece.

A piece of fabric 22, a series of runners 24 and a series of second connectors 26 may constitute a first curtain 28. The runners 24 are fixed to the piece of fabric 22 and slide along or in the rail 18. One of the runners 24, for instance the one arranged at a rearrest position of the fabric, may be fixed to the rail so as to serve as a stopper when the curtain is being pulled.

The second connectors 26 are intended to be releasably attached to the first connectors 20. The number of first connectors 20 can equate the number of second connectors 26. Alternatively, there may be more first connectors 20 than second connectors 26 to offer some flexibility to the user when positioning the curtain. In yet another alternative, the number of second connectors 26 is greater than the number of first connectors 20. The first and second connectors 20, 26 may be spaced apart (one along the windscreen, the other along the curtain) in such a way that each second connector 26 can be engaged with one first connector 20.

The first curtain 28 is shown in a retracted configuration where the runners are positioned in a rear zone of the rail 18 and the second connectors 26 are not engaged in the first connectors 20. In this configuration, the piece of fabric 22 may be arranged in a position that does not hinder the view through the window, for example in a position behind the seat 9.

As illustrated in FIG. 1, the vehicle may comprise a second curtain assembly 36. This second curtain assembly 36 is here shown in a deployed configuration. The piece of fabric 42 extends over the entirety of the window 10 and part of the windscreen 2. Runners 44 fixed to the piece of fabric 42 are engaged in the rail 38, while second connectors 46 (of a second series of second connectors, distinct from the first series present in the first curtain) are engaged with first connectors 40 (of a second series of first connectors, distinct from the first series 20). The piece of fabric 42, the runners 44 and the second connectors 46 constitute a second curtain 48.

As visible on FIG. 1, the piece of fabric 42 extends up to a substantially vertical line A which may be in the middle of the windscreen 2. In an alternative example, the vertical line A is offset to the left or the right. For example, the vertical line A may take any position from one of the A-pillar 12 to the other A-pillar 14. Preferably the vertical line A is in a range of 30%-70% of the width of the windscreen (i.e., the value of D on FIG. 1, which locates the vertical line A with respect to the A-pillar 14, is comprised between 30% and 70% of the total width of the windscreen). In such a case, the first and second curtain assembly do not mirror each other. In some examples, it may be advantageous to provide a curtain system where the vertical line A is at a specific location for accessibility reasons, for instance when the dashboard or other equipment of the vehicle restrain the access to a central position of the windscreen.

When the first curtain 28 is deployed, the first piece of fabric 22 can be positioned adjacent to the second piece of fabric 44 (in its deployed configuration). Hence, an edge of the piece of fabric 22 is substantially aligned with the vertical line A. The first and second curtain may be connected together at this junction. A third series of connectors 60, 62 may be provided to that end.

The first series of connectors 20, 26, the second series of connectors 40, 46 and/or the third series of connectors 60, 62 may be chosen amongst: hooks and rings combination; magnets of opposite polarities; hook-and-loop fasteners; snap-buttons; or any combination thereof; or any equivalent fixation means that are releasably engaging one another by a user hand.

The first and/or the second curtain 28, 48 may be further provided with means 70, 72 intended to maintain the curtain in its open/retracted configuration, such as for example snap-buttons, a holding strap or equivalent.

At least one of these snap-button elements 70 may be provided between two second connectors 26, 46 and at least one corresponding snap-button element may be fixed to the piece of fabric 22, 42 or may be fixed to a wall of the cabin of the vehicle.

An airbag 50 can be positioned in or nearby the A-pillar 12. A housing 52 receives the airbag 50, the housing being remote from the rail such that a cover of the housing and the airbag 50 can be deployed without interference from the rail. Hence, the cover of the housing may be pushed out, or pivoted out, and the airbag can have a trajectory that does not cross the space occupied by the rail. A similar airbag assembly can be provided in or nearby the other A-pillar 14. Alternatively or in addition to those airbags, airbags can be provided above and parallel to the rails 18, 38. The absence of a single rail extending above the side window and the windscreen facilitates the deployment of such airbags as well.

Figure 2:
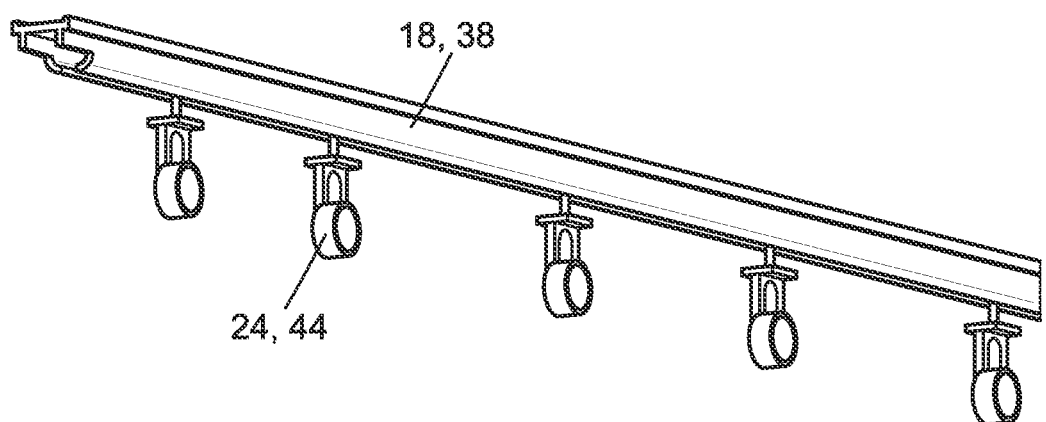
FIG. 2 is an example of a runners engaged in a rail.

FIG. 2 shows an example of runners 24, 44 engaged in a rail 18, 38. As an upper portion of the runners 24, 44 is slidingly received in the rail 18, 38, a lower portion of the runners 24, 44 is fixed to the piece of fabric 22, 42 (not shown).

Figure 3:
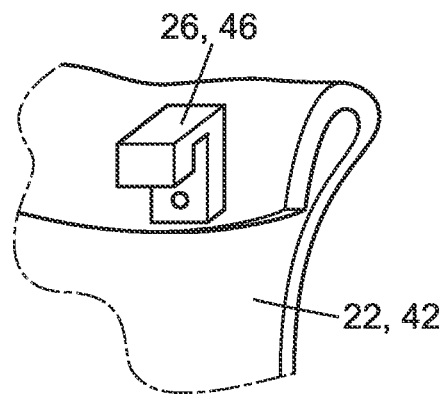
FIG. 3 is an example of a second connector.

FIG. 3 shows an example of second connectors 26, 46 which are here shown as plastic hooks attached to the piece of fabric 22, 42.

Figure 4:
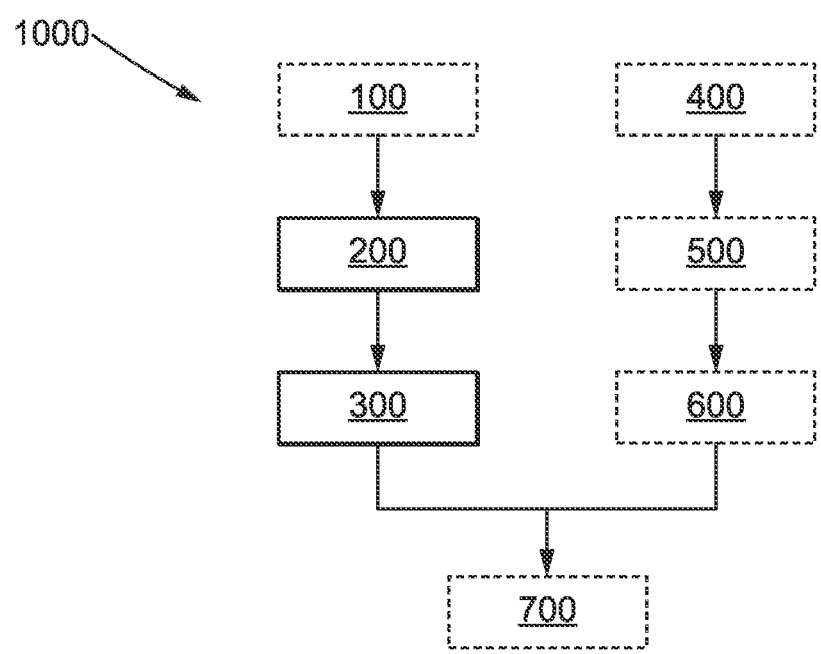
FIG. 4 is an exemplary method for operating the vehicle curtain system of the present disclosure.

FIG. 4 shows an example of a method 1000 for closing a curtain assembly 16, 36 as shown in FIG. 1. Optional steps are illustrated in dash lines.

The method may comprise the detachment 100 of the first curtain 28 and/or the detachment 400 of the second curtain 48 from their retracted configuration (optional snap-buttons 70, 72 discussed above).

The first curtain 28 is then pulled forward 200, making the runners 24 slide in the rail 18. The second connectors 26 are then fixed to the first connectors 20 at step 300.

If the vehicle comprises a second curtain assembly 36, the second curtain 48 is pulled forward at step 500 and the second connectors 46 are then attached to the first connectors 40 at step 600.

Optionally, in step 700, the first piece of fabric 22 is connected to the second piece of fabric 42 by means of third connectors 60, 62.

The disclosure also relates to a method for opening the curtain assembly, by performing the steps of method 1000 in a reverse order.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures in a normal orientation of a vehicle. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A vehicle comprising a windscreen and a side door having a window, the vehicle further comprising a curtain assembly, the curtain assembly comprising:
    a rail located above the window;
    a series of first connectors located above the windscreen; and
    a curtain comprising:
        a piece of fabric;
        a series of runners fixed to the piece of fabric, the runners of the series of runners being engaged and slidable in the rail; and
        a series of second connectors fixed to the piece of fabric, each second connector of the series of second connectors being releasably engageable with a respective first connector of the series of first connectors.

2. The vehicle of claim 1, wherein the first connectors are rings, and the second connectors are hooks releasably engageable in the rings.

3. The vehicle of claim 1, wherein the first connectors are permanent magnets of a first polarity, and the second connectors are permanent magnets of a second polarity opposite the first polarity.

4. The vehicle of claim 1, wherein the first connectors and the second connectors are hook-and-loop fasteners.

5. The vehicle of claim 1, further comprising an airbag arranged above the window or along an A-pillar of the vehicle, the airbag being enclosed in a housing remote from the rail.

6. The vehicle of claim 1, wherein the curtain comprises snap buttons enabled to hold the curtain in a retracted configuration, at least one of which being located between two adjacent second connectors.

7. The vehicle of claim 1, wherein the side door is a first side door, the window is a first window, the curtain assembly is a first assembly, the rail is a first rail, the series of first connectors is a first series of first connectors, the curtain is a first curtain, the piece of fabric is a first piece of fabric, the series of runners is a first series of runners and the series of second connectors is a first series of second connectors, the vehicle further comprising a second side door having a second window, and a second curtain assembly, the second curtain assembly comprising:
    a second rail located above the second window;
    a second series of first connectors located above the windscreen;
    a second curtain comprising:
        a second piece of fabric;
        a second series of runners fixed to the second piece of fabric, the runners of the second series of runners being engaged and slidable in the second rail; and
        a second series of second connectors fixed to the second piece of fabric, each second connector of the second series of second connectors being releasably engageable with a respective first connector of the second series of first connectors.

8. The vehicle of claim 6, wherein the first connectors of the second series are rings and the second connectors of the second series are hooks releasably engageable in the rings.

9. The vehicle of claim 6, wherein the first connectors of the second series are permanent magnets of a first polarity, and the second connectors of the second series are permanent magnets of a second polarity opposite the first polarity.

10. The vehicle of claim 6, wherein the first connectors of the second series and the second connectors of the second series are hook-and-loop fasteners.

11. The vehicle of claim 6, wherein the first and second series of first and second connectors, and the first and second pieces of fabric are configured such that as the second connectors of the first series engage the first connectors of the first series and as the second connectors of the second series engage the first connectors of the second series, the first and second pieces of fabric cover together substantially the entirety of the windscreen and of the first and second windows.

12. The vehicle of claim 6, wherein the first curtain comprises a third series of first connectors and the second curtain comprises a third series of second connectors configured to be releasably engaged with the first connectors of the third series of first connectors.

13. The vehicle of claim 12, wherein the first and second series of first, second and third connectors, and the first and second pieces of fabric are configured such that as the second connectors of the first series engage the first connectors of the first series and as the second connectors of the second series engage the first connectors of the second series, the second connectors of the third series can engage the first connectors of the third series.

14. The vehicle of claim 12, wherein the third series of connectors is one of: hooks and rings combination; magnets of opposite polarities; or hook-and-loop fasteners.

15. The vehicle of claim 6, wherein the first and second series of first and second connectors, and the first and second pieces of fabric are configured such that as the second connectors of the first series engage the first connectors of the first series and as the second connectors of the second series engage the first connectors of the second series, the first and second pieces of fabric are adjacent to one another along a substantially vertical line.

16. The vehicle of claim 15, wherein the vertical line is substantially centered with respect to the windscreen.

17. The vehicle of claim 1, wherein the vehicle is an electric-motor or hybrid-motor truck.

18. A method for closing a curtain assembly in a vehicle, the vehicle comprising a windscreen and a side door having a window, the vehicle further comprising a curtain assembly, the curtain assembly comprising:
   a rail located above the window;
   a series of first connectors located above the windscreen;
   a curtain comprising:
      a piece of fabric; and
      a series of runners fixed to the piece of fabric, the runners of the series of runners being engaged and slidable in the rail; and
   a series of second connectors fixed to the piece of fabric, each second connector of the series of second connectors being releasably engageable with a respective first connector of the series of first connectors;
the method comprising:
   pulling the curtain so that the runners slide in the rail; and
   connecting each second connector to a first connector.

19. The method of claim 18, wherein the side door is a first side door, the window is a first window, the curtain assembly is a first assembly, the rail is a first rail, the series of first connectors is a first series of first connectors, the curtain is a first curtain, the piece of fabric is a first piece of fabric, the series of runners is a first series of runners and the series of second connectors is a first series of second connectors, the vehicle further comprising a second side door having a second window, and a second curtain assembly, the second curtain assembly comprising:
   a second rail located above the second window;
   a second series of first connectors located above the windscreen;
   a second curtain comprising:
      a second piece of fabric;
      a second series of runners fixed to the second piece of fabric, the runners of the second series of runners being engaged and slidable in the second rail; and
      a second series of second connectors fixed to the second piece of fabric, each second connector of the second series of second connectors being releasably engageable with a respective first connector of the second series of first connectors;
the method further comprising:
   pulling the second curtain so that the runners of the second series of runners slide in the second rail; and
   connecting each second connector of the second series of second connectors to a first connector of the second series of first connectors.

20. The method of claim 19, further comprising connecting the first piece of fabric to the second piece of fabric.

* * * * *